United States Patent [19]
Naarmann et al.

[11] 4,058,508
[45] Nov. 15, 1977

[54] POLYMERS CONTAINING URETHANE GROUPS

[75] Inventors: Herbert Naarmann, Wattenheim; Heinz Pohlemann, Limburgerhof, both of Germany

[73] Assignee: BASF Aktiengesellschaft, Ludwigshafen, Germany

[21] Appl. No.: 632,641

[22] Filed: Nov. 17, 1975

[30] Foreign Application Priority Data

Nov. 30, 1974 Germany ............................ 2456737

[51] Int. Cl.² ...................... C08F 18/24; C08E 18/22; C08G 63/00; C08F 20/26
[52] U.S. Cl. ............................ 260/77.5 BB; 526/218; 526/229; 526/240; 526/312
[58] Field of Search ............................. 526/301, 312; 260/77.5 BB

[56] References Cited

U.S. PATENT DOCUMENTS

| | | | |
|---|---|---|---|
| 2,718,516 | 9/1955 | Bortnick | 260/77.5 BB |
| 2,768,154 | 10/1956 | Unruh et al. | 260/77.5 BB |
| 2,806,838 | 9/1957 | Melameo | 260/77.5 BB |

FOREIGN PATENT DOCUMENTS

| | | | |
|---|---|---|---|
| 537,987 | 3/1957 | Canada | 260/77.5 BB |
| 778,423 | 7/1957 | United Kingdom | 260/77.5 BB |

*Primary Examiner*—Herbert J. Lilling
*Attorney, Agent, or Firm*—Keil, Thompson & Shurtleff

[57] ABSTRACT

Polymers of which the side chains contain urethane groups and which have the reactivity of a urethane but can, in addition, contain other reactive groups. The new polymers may be used to produce moldings, coatings or adhesives.

6 Claims, No Drawings

POLYMERS CONTAINING URETHANE GROUPS

The present invention relates to new polymers and to a process for their manufacture.

It is an object of the present invention to provide polymers which exhibit the reactivity of a urethane and may in addition contain other reactive groups.

We have found that this object is achieved by polymers which contain structural units of the general formula

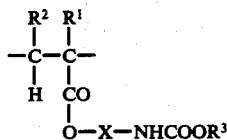

where $R^1$ is hydrogen or methyl and $R^2$ is hydrogen, carboxyl, a carboxylate salt, an ester, an amide or $COXNHCOOR^3$ group, $R^3$ is alkyl or cyclohexyl and X is $-CH_2$,

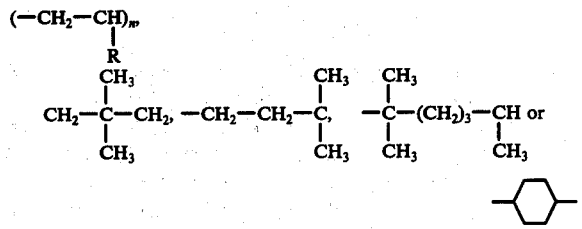

where $n$ is from 1 to 50 and R is H, alkyl, cycloalkyl or aryl.

These polymers are polyfunctional macromolecular materials of which the side chains contain urethane groups and which can undergo substitution reactions. The new polymers have molecular weights of from 1,000 to 3,000,000 and preferably from 10,000 to 100,000.

It is a further object of the present invention to provide a method of manufacture of such polymers.

We have found that this object is achieved by polymerizing unsaturated urethane compounds of the general formula

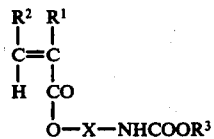

where $R^1$ is H or $CH_3$, $R^2$ is H, COOR, COOM, CONHR or $COXNHCOOR^3$, where M is a metal cation, X is

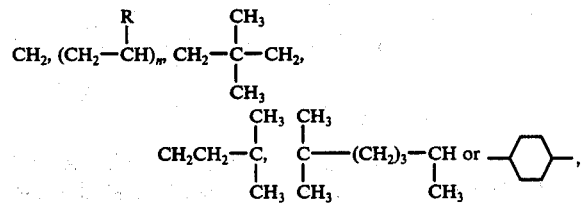

$n$ is from 1 to 50 and R is H, alkyl, cycloalkyl or aryl, and $R^3$ is alkyl or cyclohexyl, or copolymerizing such compounds with other olefinic monomers.

Particularly suitable unsaturated urethane derivatives are the compounds I-V

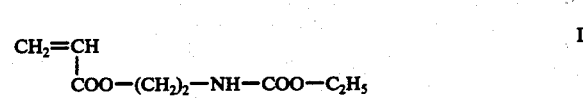

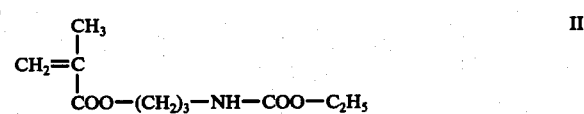

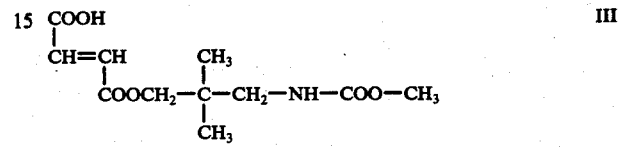

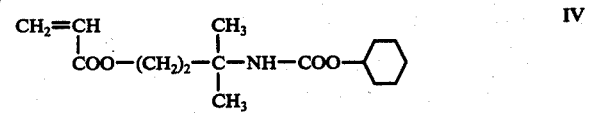

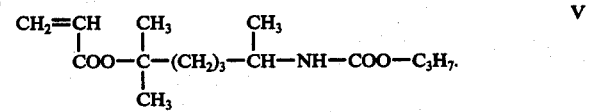

Such urethane derivatives may be manufactured, eg., by first manufacturing the corresponding urethanes from the corresponding chloroformic acid esters and aminoalcohols, and then acylating the OH group with unsaturated acid chlorides.

Examples of suitable olefinic comonomers are olefins, eg. ethylene, propylene, butadiene or isoprene, styrene and substituted styrenes, eg. α-methylstyrene, p-chlorostyrene and p-methylstyrene, esters of acrylic acid and methacrylic acid, eg. with methanol, ethanol, butanol or ethylcyclohexanol, hydroxy derivatives and amino derivatives of esters of acrylic acid, eg. hydroxypropyl acrylates or dimethylaminoethyl acrylate, acrylamide and methacrylamide and substituted amides, eg. N-methylolacrylamide, N-methylolmethacrylamide or their ethers, acrylonitrile and methacrylonitrile, vinyl esters, eg. vinyl acetate and vinyl propionate, vinyl ethers, eg. methyl vinyl ether or ethyl vinyl ether, and fumaric acid, maleic acid or itaconic acid, and esters and anhydrides of these acids. It is also possible simultaneously to copolymerize two or more of these monomers with the urethane derivatives.

The proportion of unsaturated urethane derivatives used in manufacturing the copolymers can vary within wide limits and can, eg., be from 1 to 99 percent by weight and especially from 5 to 20 percent by weight.

The polymerization may be initiated either thermally or by means of conventional free radical initiators. Examples of suitable initiators are hydrogen peroxide, inorganic peroxides, and organic hydroperoxides and peroxides, aliphatic azo compounds which decompose to free radicals, redox catalyst systems, eg. the system of persulfate and ascorbic acid, sodium bisulfite or iron-II salts, as well as the transition metal chelates known to form free radicals, especially those wherein the metal is of suitable valency, eg. chelates of manganese (III, cobalt(III), copper (II) and cerium (IV) with 1,3-dicarbonyl compounds.

The initiators are in general used in amounts of from 0.05 to 5 percent by weight, based on the amount of monomer. The optimum amount and the most effective initiator may easily be found by tests.

The polymerization may be carried out in bulk, but also in the presence of solvents or diluents. Very suitable examples of these are alcohols, ketones, ethers, aliphatic, cycloaliphatic or aromatic hydrocarbons, formamide and dimethylformamide. Water is particularly advantageously used as the diluent.

The suspension polymerization, solution polymerization or emulsion polymerization processes conventionally used for other monomers are also suitable for the above process. In respect of the assistants which may be used, eg. buffers, dispersing agents, protective colloids and the like, the process according to the invention again does not differ from conventional processes.

The polymerization may be carried out within a wide range of temperatures, from about 0° to 100° C and preferably from 50° to 85° C. In general, the polymerization is carried out under atmospheric pressure, but lower or higher pressures, eg. of up to 3,000 atmospheres, may also be employed. Particularly when using low-boiling comonomers, higher pressures are used to bring about a sufficient concentration of comonomer in the reaction mixture.

The copolymerization of the unsaturated urethane derivatives with ethylene or butadiene is advantageously carried out in emulsion; the copolymerizable monomers are introduced into an aqueous soap emulsion which contains an initiator, a buffer system and, optionally, a protective colloid, and are polymerized under superatmospheric pressure. The copolymerization with esters of acrylic acid is suitably carried out in aromatic or aliphatic hydrocarbons under the conventional conditions for the polymerization of such esters.

The polymers of the invention may be used, eg., to manufacture moldings, coatings or adhesives, and may also be used as mixtures with other plastics, eg. polyethylene, polypropylene or copolymers of ethylene and vinyl acetate. Such products accept dyes. Because of their surface-active properties and antistatic properties the polymers manufactured according to the invention may, inter alia, be used for finishing paper and textiles. Copolymers of esters of acrylic acid, which contain from about 2 to 20 percent by weight of a urethane derivative and from about 2 to 10 percent by weight of hydroxyl-containing monomers, eg. hydroxypropyl acrylate, may be used as corrosion inhibitors and surface coatings. If, in addition to the urethane groups, the polymers contain further reactive groups, eg. —OH, —NH$_2$ or —COOH, which have been introduced by copolymerization, the copolymer can be crosslinked by heating and may be used as a reactive surface coating.

In the Examples, parts and percentages are by weight. The K values are a measure of the mean molecular weight and were in each case determined on a one percent strength solution in dimethylformamide, in accordance with the method of H. Fikentscher, Cellulosechemie 13, 58 (1932).

EXAMPLE 1

100 parts of compound I and 0.1 part of azo-bis-isobutyronitrile are heated for 4 hours at 60° C, under nitrogen, whilst stirring. After precipitation with methanol, washing and drying, 90 parts of a polymer of K value 68, having a glass transition temperature $T_G$ of −42° C, are obtained.

EXAMPLES 2 TO 12

Ethyl acrylate and compound II are mixed in certain ratios and after addition of 0.1% of azo-bis-isobutyronitrile each mixture is heated at 70° C for 2 hours. The copolymers obtained were precipitated with methanol, washed and dried for 10 hours in a vacuum drying oven at 60° C and 12 mm Hg. The properties of the products obtained are summarized in the Table which follows:

| Example | Proportion of II in the batch (in %) | Conversion (in %) | K valve | Proportion of II in the copolymer (in %) |
| --- | --- | --- | --- | --- |
| 2 | 1 | 96.0 | 66 | 0.7 |
| 3 | 5 | 94.0 | 65 | 4.5 |
| 4 | 10 | 96.0 | 62 | 9.2 |
| 5 | 20 | 96.0 | 68 | 17.5 |
| 6 | 30 | 96.5 | 69 | 26.0 |
| 7 | 40 | 99.5 | 69 | 37.0 |
| 8 | 50 | 98.5 | 69 | 48.0 |
| 9 | 60 | 98.5 | 68 | 67.8 |
| 10 | 70 | 100 | 66 | 68.5 |
| 11 | 80 | 100 | 64 | 78.5 |
| 12 | 90 | 100 | 60 | 89.3 |

EXAMPLE 13

30 parts of compound II are mixed with 2 parts of sodium pyrophosphate, 4.5 parts of potassium persulfate, 2 parts of the sodium salt of a sulfonated fatty alcohol of 10 to 15 carbon atoms and 1,000 parts of water. Butadiene is forced into this mixture, whilst stirring, for 8 hours at 90° C, in such amounts that the butadiene pressure in the gas space is 2.85 atmospheres gauge. After a reaction time of 8 hours the solids content of the dispersion is 20 percent by weight. The K value of the copolymer obtained is 76. The polymer contains 10.8% of urethane derivative III introduced by copolymerization.

EXAMPLE 14

The procedure of Example 13 is followed except that urethane derivative IV is used, and butadiene is replaced by styrene. A dispersion of 25% solids content is obtained in 8 hours at 90° C. The K value of the copolymer, which contains 18.9 percent by weight of compound IV introduced by copolymerization, is 64.5.

EXAMPLE 15

If the procedure of Example 9 is followed but the ethyl acrylate is replaced by acrylonitrile, a conversion of 89%, a K value of 61 and a 50% content of urethane derivative II, introduced into the product by copolymerization, are obtained.

We claim:

1. A solid polymer which contains structural units of the formula

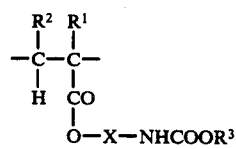

in which R$^1$ is H or CH$_3$, R$^2$ is H, COOR, COOM, CONHR or COXNH-COOR$^3$, where M is a metal cation, X is CH$_2$,

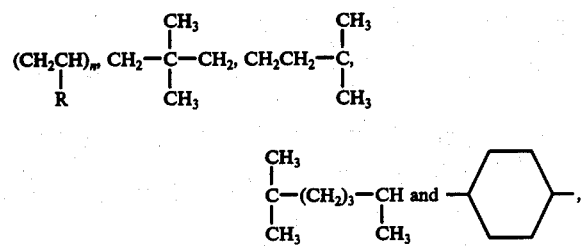

$n$ is from 1 to 50 and R is H, alkyl, cycloalkyl or aryl and $R^3$ is alkyl or cyclohexyl.

2. A polymer as set forth in claim 1, where $R^1$ and $R^2$ are H, $R^3$ is $C_2H_5$ and X is $(CH_2)_2$.

3. A polymer as set forth in claim 1, where $R^1$ is $CH_3$, $R^2$ is H, $R^3$ is $C_2H_5$ and X is $(CH_2)_3$.

4. A polymer as set forth in claim 1, where $R^1$ is H, $R^2$ is COOH, $R^3$ is $CH_3$ and X is $CH_2$—$C(CH_3)_2$—$CH_2$.

5. A polymer as set forth in claim 1, where $R^1$ and $R^2$ are H, $R^3$ is $C_6H_{11}$ and X is $(CH_2)_2$—$C(CH_3)_2$.

6. A polymer as set forth in claim 1, where $R^1$ and $R^2$ are H, $R^3$ is $C_3H_7$ and X is $C(CH_3)_2$—$(CH_2)_3$—$CH(CH_3)$.

* * * * *